United States Patent [19]
Al-Amin et al.

[11] Patent Number: 5,897,137
[45] Date of Patent: Apr. 27, 1999

[54] TECHNIQUE FOR DETECTING A LEAK OF AIR BAG INFLATION GAS FROM A STORAGE CHAMBER

[75] Inventors: Ahmad K. Al-Amin, Higley; Bryan W. Shirk, Mesa, both of Ariz.

[73] Assignee: TRW Inc., Lyndhurst, Ohio

[21] Appl. No.: 08/946,316

[22] Filed: Oct. 7, 1997

[51] Int. Cl.[6] .................................................. B60R 21/28
[52] U.S. Cl. ........................ 280/741; 280/736; 102/530
[58] Field of Search .................................... 280/741, 736; 102/530, 531; 222/3

[56] References Cited

U.S. PATENT DOCUMENTS

| | | |
|---|---|---|
| 4,538,395 | 9/1985 | Edmonds et al. . |
| 4,650,088 | 3/1987 | Hirota et al. . |
| 4,821,151 | 4/1989 | Pryor et al. . |
| 5,375,394 | 12/1994 | Heudecker . |
| 5,404,746 | 4/1995 | Ocker ........................................... 73/37 |
| 5,435,470 | 7/1995 | Kim . |
| 5,529,333 | 6/1996 | Rizzi et al. . |
| 5,547,217 | 8/1996 | Zelenak et al. . |
| 5,564,478 | 10/1996 | Weinheimer et al. . |
| 5,564,741 | 10/1996 | Ward et al. . |
| 5,609,362 | 3/1997 | Sparks et al. . |
| 5,615,912 | 4/1997 | O'Laughlin et al. ........................ 280/737 |
| 5,673,933 | 10/1997 | Miller et al. ................................. 280/736 |
| 5,683,107 | 11/1997 | Headley et al. ............................. 280/741 |

Primary Examiner—Christopher P. Ellis
Attorney, Agent, or Firm—Tarolli, Sundheim, Covell, Tummino & Szabo

[57] ABSTRACT

An air bag inflator (10) comprises a vessel (12) having a chamber (30). An air bag inflation gas (32) is stored in the chamber (3). A fill passage (38) is provided in the vessel (12) for directing the air bag inflation gas (32) into the chamber (30). Blocking means (60) is provided in the fill passage (38) for blocking flow of the air bag inflation gas (32) from the chamber (30) through the fill passage. A closure (70) is welded to the vessel (12) and blocks gas flow past the closure. A detectable gas (84), different than the air bag inflation gas (30), is stored in the fill passage (38) between the blocking means (60) and the closure (70). The presence of the detectable gas in the fill passage (38) is checked to determine whether the closure (70) is properly sealed.

19 Claims, 2 Drawing Sheets

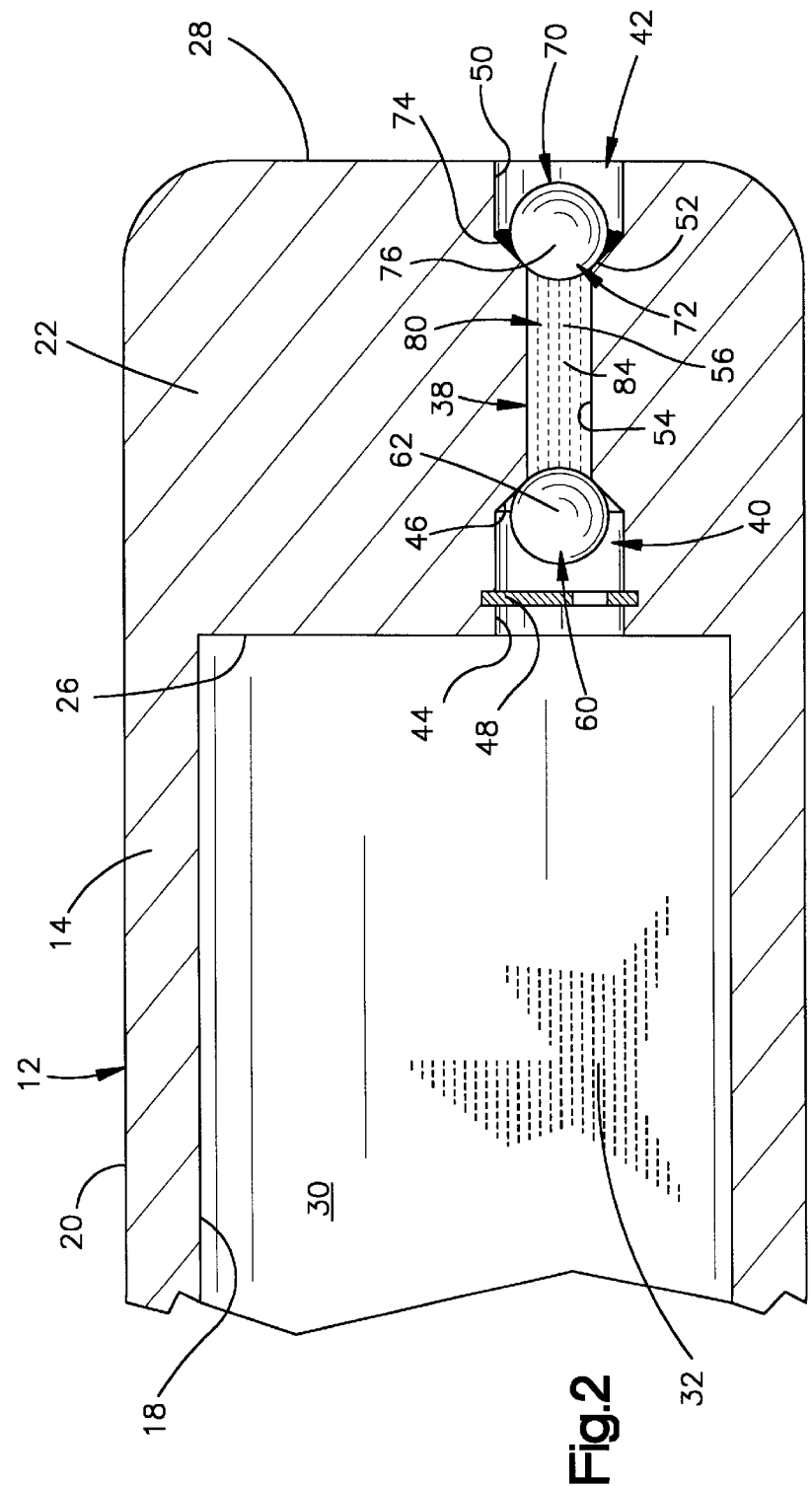

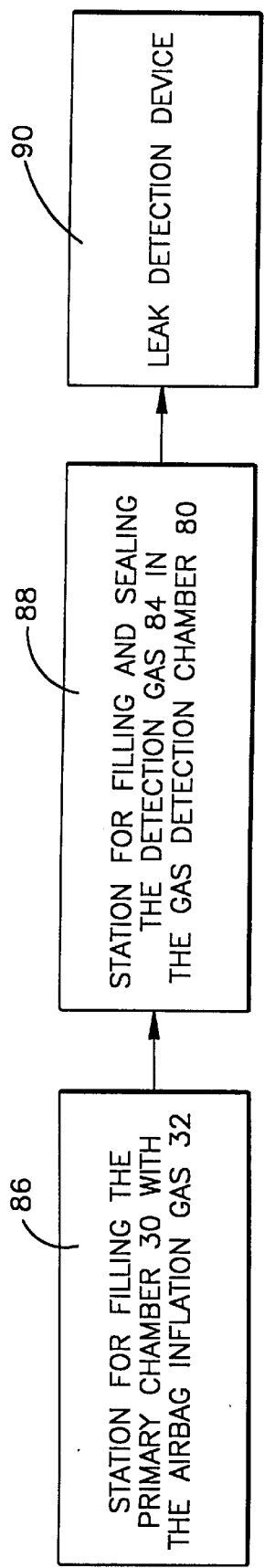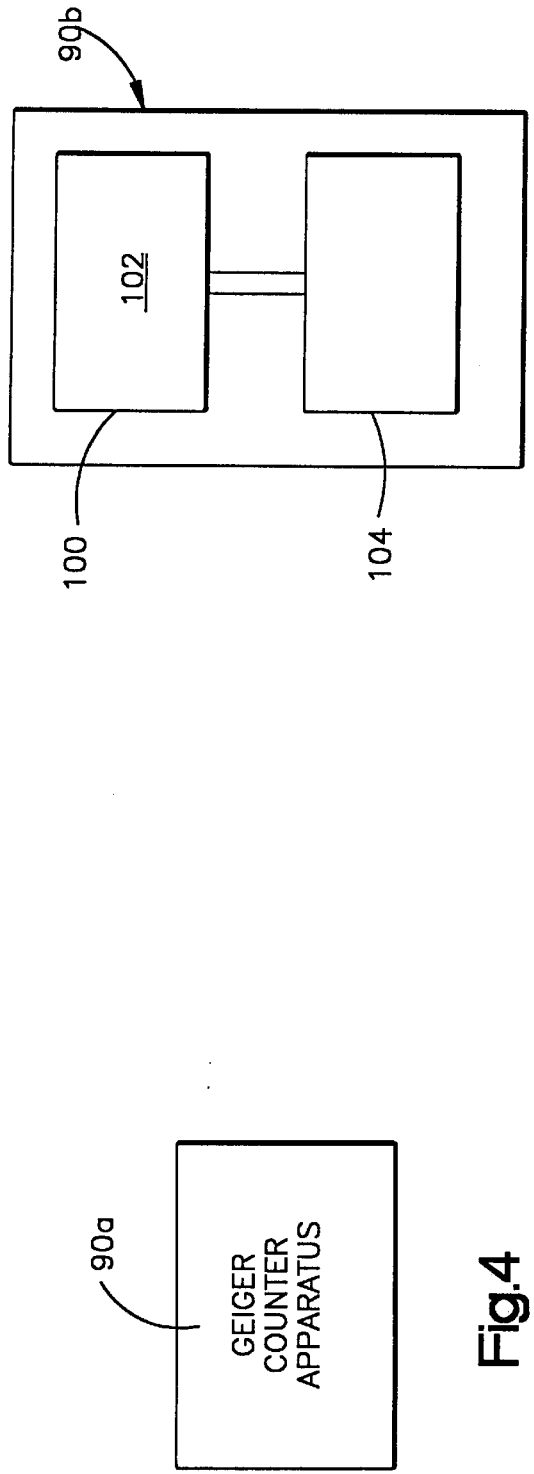

TECHNIQUE FOR DETECTING A LEAK OF AIR BAG INFLATION GAS FROM A STORAGE CHAMBER

TECHNICAL FIELD

The present invention relates to a technique for detecting a leak of air bag inflation gas from a storage chamber.

BACKGROUND OF THE INVENTION

An inflator for inflating a vehicle occupant protection device, such as an air bag, includes a gas stored in a chamber of a vessel. The vessel has a fill passage for directing the air bag inflation gas into the chamber. A check valve is located in the fill passage to block flow of the air bag inflation gas from the chamber through the fill passage. A closure is welded to the vessel to block gas flow past the closure.

SUMMARY OF THE INVENTION

In accordance with the present invention, an air bag inflator comprises a vessel having a chamber. Inflation gas for an air bag is stored in the chamber. The vessel has means defining a fill passage in the vessel for directing the inflation gas into the chamber. A blocking means in the fill passage blocks flow of the inflation gas from the chamber through the fill passage. A closure is welded to the vessel and blocks gas flow past the closure. A detectable gas, different than the air bag inflation gas, is stored in the fill passage between the blocking means and the closure.

Further, in accordance with the present invention, a method comprises the steps of providing a vessel having a chamber. An inflation gas for an air bag is directed into the chamber through a fill passage in the vessel. A blocking means is provided for blocking flow of the inflation gas from the chamber through the fill passage. A closure is welded to the vessel to block gas flow past the closure. A detectable gas, different than the air bag inflation gas, is placed in the fill passage between the blocking means and the closure.

BRIEF DESCRIPTION OF THE DRAWINGS

The foregoing and other features of the invention will become more apparent to one skilled in the art upon consideration of the following description of the invention and the accompanying drawings in which:

FIG. 1 is a schematic view of a vehicle occupant protection system;

FIG. 2 is a schematic sectional view of a portion of an inflator constructed in accordance with a preferred embodiment of the present invention for use in the system of FIG. 1;

FIG. 3 is a flow diagram schematically illustrating the method of the present invention;

FIG. 4 is a part in FIG. 3 in accordance with a first embodiment of the present invention; and FIG. 5 is a part in FIG. 3 in accordance with a second embodiment of the present invention.

DESCRIPTION OF PREFERRED EMBODIMENTS

Referring to FIG. 1, a vehicle occupant protection system 2 includes an inflatable vehicle occupant protection device 4. In the preferred embodiment of the present invention, the protection device 4 is an air bag. Other inflatable vehicle occupant protection devices could be, for example, inflatable seat belts, inflatable knee bolsters, inflatable head liners or side curtains, and knee bolsters operated by inflatable air bags.

An inflator 10 is associated with the inflatable vehicle occupant protection device 4. The inflator 10 is actuatable to provide inflation fluid for inflating the vehicle occupant protection device, i.e. the air bag 4. When the air bag 4 is inflated, it extends into a vehicle occupant compartment (not shown) to help protect a vehicle occupant from a forceful impact with parts of the vehicle as a result of a collision, for example.

The system 2 also includes a crash sensor 6. The crash sensor 6 is a known device that senses a vehicle condition that indicates the occurrence of a collision. If the vehicle condition sensed by the crash sensor 6 is at or above a predetermined threshold level, the sensor 6 indicates the occurrence of a crash having at least a predetermined threshold level of severity. The threshold level of crash severity is a level at which inflation of the air bag 4 is desired for protection of a vehicle occupant.

The vehicle condition that is sensed by the crash sensor 6 preferably is sudden vehicle deceleration, such as deceleration caused by a collision. The crash sensor 6 measures the magnitude and duration of the deceleration. If the magnitude and duration of the deceleration meet or exceed predetermined threshold levels, the occurrence of a crash that meets or exceeds the predetermined threshold level of crash severity is indicated. A deployment signal is then transmitted to the inflator 10 to actuate the inflator.

The inflator 10 may be of various constructions and could be a hybrid inflator (not shown). A hybrid inflator typically comprises a container housing a body of combustible material and a quantity of a stored gas. The body of combustible material is ignited and produces combustion products which mix with the stored gas to form an inflation fluid for inflating the air bag 4.

In the preferred embodiment of the invention, the inflator 10 is a heated gas inflator (FIG. 2). The heated gas inflator 10 includes a generally cylindrical vessel or container 12 made of a suitable material. The container 12 includes a generally cylindrical wall 14. The wall 14 includes a cylindrical inner surface 18 having a first diameter. The wall 14 further includes a cylindrical outer surface 20 having a second diameter, larger than the first diameter. The container 12 includes a first end wall 22 at one end of the wall 14 and a second end wall (not shown) at the opposite end of the wall 14. The first end wall 22 includes a first circular wall surface 26 and a second circular wall surface 28 spaced a distance from the first circular wall surface.

The wall 14, the first end wall 22 and the second end wall define a primary chamber 30 in the container 12 which holds a supply of an inflation gas 32 that in the preferred embodiment is a gas for inflating an air bag. Specifically, the primary chamber 30 is defined in part by the cylindrical inner surface 18 and the first circular wall surface 26.

The air bag inflation gas 32 in the preferred embodiment of the invention comprises a mixture of gases including an inert gas, a combustible fuel gas and an oxidizer gas. The inert gas is preferably nitrogen, argon or a mixture of nitrogen and argon. The fuel gas is preferably hydrogen, a hydrocarbon, such as methane, or a mixture of hydrogen and a hydrocarbon. The oxidizer gas is preferably oxygen. In another specific embodiment, the air bag inflation gas 32 comprises air (nitrogen and oxygen) and hydrogen and/or methane.

The air bag inflation gas 32 within the container 12 is normally under pressure. The pressure depends upon such factors as the volume of the air bag 4 to be inflated, the time available for inflation, the inflation pressure desired, the volume of the container 12 storing the air bag inflation gas 32, and the molar percentage of each of the gases in the air bag inflation gas. The air bag inflation gas 32 in the primary chamber 30 is at a pressure of about 500 to about 5,000 pounds per square inch (psi). Preferably, the air bag inflation gas 32 in the primary chamber 30 is at a pressure of about 2,000 to about 4,000 psi.

Upon the occurrence of sudden vehicle deceleration indicative of a collision for which inflation of the occupant protection device 4 is desired, the sensor 6, activates an igniter (not shown) in the primary chamber 30 to ignite the fuel gas in the air bag inflation gas 32. The oxidizer gas supports the combustion of the fuel gas.

Burning of the fuel gas results in combustion products, which include heat. The pressure in the primary chamber 30 rises due to warming of at least the inert gas by the heat created by the combustion of the fuel gas. Other gases or vapors may also result from the combustion of the fuel gas.

After a predetermined time, or when a predetermined pressure is reached in the primary chamber 30, the pressure of the inflation fluid (in this case, inflation gas) in the primary chamber causes the inflation fluid to flow into the air bag 4. For example, a burst disk may rupture to allow inflation fluid to flow into the air bag 4. As the inflation fluid flows into the air bag 4, the inflation fluid inflates the air bag 4 into a predetermined position for protecting a vehicle occupant.

A fill passage 38 is formed in the first end wall 22 of the container 12 for directing the air bag inflation gas 32 into the primary chamber 30. The fill passage 38 extends through the end wall 22 from the primary chamber 30 to the exterior of the container 12. The fill passage 38 extends through the first end wall 22 between the first circular wall surface 26 and the second circular wall surface 28.

The fill passage 38 includes a first enlarged portion 40 adjacent to the primary chamber 30 and a second enlarged portion 42 adjacent to the exterior of the container 12. The first and second enlarged portions 40, 42 of the fill passage are interconnected by a connector passage 56.

The first enlarged portion 40 is defined by a first cylindrical surface 44 which extends axially from the first circular wall surface 26 towards the second circular wall surface 28. The first enlarged portion 40 is further defined by a first tapered surface 46 which extends radially inward from the first cylindrical surface 44 towards the connector passage 56.

The second enlarged portion 42 is defined by a second cylindrical surface 50 which extends from the second circular wall surface 28 towards the primary chamber 30. The second enlarged portion 42 is further defined by a second tapered surface 52 which extends radially inward from the second cylindrical surface 50 towards the connector passage 56.

The connector passage 56 is defined by a third cylindrical surface 54 extending between the first and second tapered surfaces 46 and 52, respectively. The connector passage 56 thus extends between and connects the first enlarged portion 40 and the second enlarged portion 42. The third cylindrical surface 54 has a diameter that is smaller than the diameter of the first and second cylindrical surfaces 44 and 50, respectively. Preferably, the diameter of the third cylindrical surface 54 is about one-eight of an inch.

A check valve 60 is located in the first enlarged portion 40 of the fill passage 38. The check valve 60 has a closed position for blocking gas flow from the primary chamber 30 and an opened position for allowing gas to be directed into the primary chamber.

In the preferred embodiment, the check valve 60 is a steel ball displaceably received in the first enlarged portion 40. The check valve 60 is located intermediate a retaining member 48 and the connector passage 56. The retaining member 48 maintains the ball 60 within the first enlarged portion 40 but permits gas to flow past the retaining number.

The retaining member 48 is shown disposed within a groove in the first cylindrical surface 44 intermediate the first circular wall surface 26 and the first tapered surface 46. The retaining member 48 could have any number of configurations and could be a single bar which does not block fluid flow through the first enlarged passage portion 40 but blocks movement of the ball 60 from the enlarged passage portion.

The ball 60 has an arcuate surface 62, which is preferably spherical. The arcuate surface 62 of the ball 60 is acted upon by the pressure of the air bag inflation gas 32 in the primary chamber 30 when the primary chamber is filled. This pressure urges the ball 60 against the first tapered surface 46 so that the ball 60 seals the fill passage 38 and blocks the flow of the air bag inflation gas 32 from the primary chamber 30.

A closure 70 is fixedly secured to the first end wall 22 of the container 12 to block the flow of the air bag inflation gas 32 from the primary chamber 30 in the event that a gas leak occurs at the check valve 60. In the preferred embodiment, the closure 70 is a steel ball 72 welded at weld 74 to surfaces 50 and 52 of the second enlarged portion 42 of the fill passage 38. The ball 72 has a spherical outer surface 76. Before being welded in the fill passage 38, the ball 72 is positioned so that portions of the second arcuate surface 76 of the ball abut the second tapered surface 52, as shown in FIG. 2.

When the ball 72 is welded into the fill passage 38 in the manner described above, gas flow past the closure 70 is blocked, i.e., gas flow into and out of the container 12 through the closure 70 is blocked. While the closure 70 is illustrated in FIG. 2 as being the welded ball 72, it is contemplated that other closures such as a welded plate (not shown) could be employed.

The third cylindrical wall 54, the first arcuate surface 62 of the check ball 60 and the second arcuate surface 76 of the ball 72 cooperate to define a detection gas chamber 80. Preferably, the length of the gas detection chamber 80 is about one-half of an inch and the diameter of the gas detection chamber is about one-eight of an inch.

A supply of a detectable gas 84, different from the air bag inflation gas 32, is stored within the detection gas chamber 80 at a pressure of about one atmosphere. The detectable gas 84 is used for detecting the presence of a gas leak at the closure 70.

In one embodiment, the detectable gas 84 is a radioactive gaseous material such as krypton 85 or radon. In an alternative embodiment, the detectable gas is helium.

Referring to FIG. 3, the primary chamber 30 of the inflator 10 is charged with the air bag inflation gas 32 at an air bag inflation gas filling station 86. As the inflation gas 32 is flowing into the chamber 30, the ball 60 is retained in the first enlarged portion 40 of the fill passage by retainer 48. The inflation gas can flow past the retainer 48. After chamber 30 is filled, the gas pressure in chamber 30 acting on the ball 60 causes the ball 60 to seal against the first tapered surface 46. The detectable gas 84 is then placed in the gas detection chamber 80 of the inflator 10 at a detectable gas filling and sealing station 88. At the sealing station 88, the ball 72 is welded in place.

After the gas detection chamber 80 is charged with the detectable gas 84, the inflator 10, and specifically the gas detection chamber, can be passed through a detection apparatus 90, illustrated schematically in FIG. 3, to determine if a leak has occurred in the closure 70. This can be done at any time during the life of the inflator.

In the first embodiment, where the detectable gas 84 is a radioactive gaseous material, the gas detection apparatus 90 is in the nature of a Geiger counter apparatus 90a shown schematically in FIG. 4. The Geiger counter apparatus 90a measures the amount of radioactive gaseous material present in the gas detection chamber 80. The Geiger counter apparatus 90a can determine the amount of radioactive gaseous material present in the gas detection chamber 80 by measuring the amount of beta particles which are present in the gas detection chamber. The amount of beta particles present in the gas detection chamber 80 is proportional to the volume, or amount, of radioactive gaseous material that is present in the gas detection chamber.

Normally the amount of beta particles in the gas detection chamber 80 is measured immediately after the closure 70 has been secured to the container 12. This measurement, known as the "base measurement", is ascertained to determine the base level of beta particles, and thus the amount of radioactive gaseous material, present in the gas detection chamber 80 immediately after the gas detection chamber 80 has been charged with the radioactive material and the closure 70 has been secured to the container 12.

Once the base level of beta particles is determined, the inflator 10 can then be passed through the Geiger counter apparatus 90a at any time thereafter to measure the amount of beta particles present in the gas detection chamber 80. Any such measurement is known as a "subsequent measurement." While a subsequent measurement can be ascertained at any time after the base measurement has been ascertained, normally, subsequent measurements are taken about one day after the base measurement is ascertained.

The level of beta particles present in the gas detection chamber 80 during the subsequent measurement is then compared to the level of beta particles determined to be in the gas detection chamber during the base measurement. If the level of beta particles in the gas detection chamber 80 as determined in a subsequent measurement is less than the level of beta particles in the gas detection chamber as determined in the base measurement, this indicates that a leak has occurred in the closure 70. When a leak has occurred in the closure 70, the inflator 10 is deemed not to be fit for use in the vehicle occupant protection system 2. The inflator 10 is then disposed of. This is because the closure 70 cannot be relied upon to prevent the air bag inflation gas 30 in the primary chamber 32 from leaking out of the container 12.

If the level of beta particles in the gas detection chamber 80 as determined in a subsequent measurement is the same as the level of beta particles in the gas detection chamber as determined in the base measurement, this indicates that a leak has not occurred in the closure 70, as of the time of the subsequent measurement. The inflator 10 is thus fit for use in a vehicle occupant protection system 2.

In the second embodiment, where the detectable gas 84 is helium, the gas detection apparatus 80 is a helium detection apparatus 90b shown schematically in FIG. 5. The helium detection apparatus 90a can determine if a helium leak has occurred in the closure 70.

The helium detection apparatus 90b (FIG. 5) includes a test container 100 defining a test chamber 102 and a mass spectrometer 104. The mass spectrometer 104 includes a vacuum pump for creating a vacuum in the test chamber.

To determine if the closure 70 has a gas leak, the inflator 10 is placed in the test chamber 102. The vacuum pump then evacuates the test chamber 102. If a gas leak is present in the closure 70, the helium gas will flow past the closure 70 into the mass spectrometer 104. The mass spectrometer 104 will then indicate the presence of helium, thereby indicating the occurrence of a leak in the closure 70.

In the event of a gross leak situation, it is possible that all of the helium gas may have leaked out of the gas detection chamber 80 prior to testing in the helium detection apparatus 90b. If all of the helium has leaked out of the gas detection chamber 80 prior to testing the inflator 10 in the helium detection apparatus 80b, the mass spectrometer 104 will not detect the presence of helium, but the presence of a leak in the closure 70 can still be detected.

If there is a leak in the closure 70 and all of the helium gas has leaked from the gas detection chamber 80 prior to testing the inflator 10 in the helium detection apparatus 90b, the amount of time required to bring the test chamber 102 to a vacuum is increased relative to the time it would take to bring the test chamber to a vacuum if the closure did not have a leak. When a leak is detected in the closure 70, the inflator 10 is deemed not to be fit for use in a vehicle occupant protection system 2 and the inflator is disposed of.

From the above description of the invention, those skilled in the art will perceive improvements, changes and modifications. Such improvements, changes and modifications within the skill of the art are intended to be covered by the appended claims.

Having described the invention, the following is claimed:

1. An air bag inflator comprising:

a vessel having a chamber;

an air bag inflation gas stored in said chamber;

a fill passage in said vessel for directing the air bag inflation gas into said chamber;

blocking means in said fill passage for blocking flow of the air bag inflation gas from said chamber through said fill passage;

a closure welded to said vessel and blocking gas flow past said closure; and a detectable gas different than said air bag inflation gas in said fill passage between said blocking means and said closure.

2. The inflator of claim 1 wherein said detectable gas comprises a radioactive gaseous material.

3. The inflator of claim 2 wherein said radioactive gaseous material comprises krypton 85.

4. The inflator of claim 2 wherein said radioactive gaseous material comprises radon.

5. The inflator of claim 1 wherein said detectable gas comprises helium.

6. The inflator of claim 1 wherein said blocking means comprises a ball check valve.

7. The inflator of claim 1 wherein said closure comprises a ball.

8. The apparatus of claim 1 wherein said detectable gas is stored at a pressure in said fill passage of about one atmosphere.

9. The apparatus of claim 8 wherein said air bag inflation gas is stored in said chamber at a pressure of about 500 to about 5,000 psi.

10. A method comprising the steps of:

providing a vessel having a chamber, directing an air bag inflation gas into the chamber through a fill passage in the vessel, providing blocking means for blocking flow of the air bag inflation from the chamber through the fill passage;

welding a closure to the vessel to block gas flow past the closure, and placing a detectable gas, different than the air bag inflation gas, in the fill passage between the blocking means and the closure.

11. The method of claim 10 wherein the detectable gas comprises a radioactive gaseous material.

12. The inflator of claim 11 wherein the radioactive gaseous material comprises krypton 85.

13. The inflator of claim 11 wherein the radioactive gaseous material comprises radon.

14. The inflator of claim 10 wherein the detectable gas comprises helium.

15. The apparatus of claim 10 wherein the detectable gas is stored at a pressure in the fill passage of about one atmosphere.

16. The method of claim 10 further comprising the step of placing the vessel in a leak detection apparatus to test for the presence of the detectable gas to determine if the closure has a gas leak.

17. The method of claim 16 wherein the detectable gas is a radioactive gas and the leak detection apparatus comprises a Geiger counter apparatus for detecting the presence of beta particles to determine the presence of the radioactive gas in the fill passage.

18. The method of claim 17 wherein said step of placing the vessel in a leak detection apparatus to test for the presence of the detectable gas to determine if the closure has a gas leak comprises determining a first level of beta particles in the fill passage at a first time after placing the detectable gas in the fill passage and then determining a second level of beta particles in the fill passage at a second time, after the first time, and comparing the first level to the second level.

19. The method of claim 16 wherein the detectable gas is helium and said leak detection apparatus comprises a helium detector for determining the presence of helium.

* * * * *